US005671097A

United States Patent [19]

Merriweather, Jr.

[11] Patent Number: 5,671,097

[45] Date of Patent: Sep. 23, 1997

[54] GRAFFITI RESISTANT MIRROR

[75] Inventor: Frank Merriweather, Jr., Carson, Calif.

[73] Assignee: Bobrick Washroom Equipment, Inc., North Hollywood, Calif.

[21] Appl. No.: 355,648

[22] Filed: Dec. 14, 1994

[51] Int. Cl.$^{6}$ .................... G02B 7/182

[52] U.S. Cl. .................... 359/871; 359/870; 359/883; 248/475.1; 248/488; 248/551; 40/642; 40/611

[58] Field of Search .................... 359/514, 608, 359/838, 870, 871, 883; 248/551, 475.1, 488, 489; 40/611, 152.1, 582, 584, 642, 649, 201

[56] References Cited

U.S. PATENT DOCUMENTS

| | | | |
|---|---|---|---|
| D. 308,757 | 6/1990 | Sanford . | |
| D. 312,925 | 12/1990 | Burhardt . | |
| 1,835,042 | 12/1931 | Hammer . | |
| 2,647,441 | 8/1953 | Boydston et al. . | |
| 2,928,199 | 3/1960 | Novak | 248/551 |
| 3,125,316 | 3/1964 | Wilmhoff . | |
| 3,284,940 | 11/1966 | Putman . | |
| 3,612,469 | 10/1971 | Dennis | 248/551 |
| 3,709,456 | 1/1973 | Pietsch . | |
| 3,743,389 | 7/1973 | Stiller et al. . | |
| 3,952,436 | 4/1976 | Kuhnke . | |
| 4,161,834 | 7/1979 | Hendricks, Jr. | 248/551 |
| 4,322,053 | 3/1982 | Logie | 248/488 |
| 4,492,430 | 1/1985 | Morris et al. | 248/551 |
| 4,529,278 | 7/1985 | Nugent . | |
| 4,672,758 | 6/1987 | Le-Carpentier et al. | 40/649 |
| 4,914,842 | 4/1990 | Lieberman . | |
| 4,953,790 | 9/1990 | Ross . | |
| 5,010,673 | 4/1991 | Conner et al. . | |
| 5,058,300 | 10/1991 | Ernest et al. . | |
| 5,189,822 | 3/1993 | Schmanski et al. | 248/551 |
| 5,228,238 | 7/1993 | Fenkell . | |
| 5,452,139 | 9/1995 | Schrott | 359/870 |

FOREIGN PATENT DOCUMENTS

| | | | |
|---|---|---|---|
| 0713438 | 7/1965 | Canada | 248/475.1 |
| 0197128 | 5/1967 | U.S.S.R. | 359/883 |

OTHER PUBLICATIONS

The Mirror, International Bar & Restaurant Equipment, 8 sheets.

MIRROGARD, 1 Sheet.

*Primary Examiner*—Ricky D. Shafer
*Attorney, Agent, or Firm*—Pretty, Schroeder & Poplawski

[57] ABSTRACT

A mirror installation suitable for mounting on a wall, and having a wall mounting plate including a reflector surface, a transparent reflector surface protection sheet, positioning units carried on the wall plate for positioning the transparent sheet over the reflector surface, and a sheet clamp or frame for attaching to the wall plate and overlying edges of the transparent sheet for clamping the transparent sheet to the wall plate over the reflector surface, with the frame and the transparent sheet removable and replaceable without disturbing the reflector surface.

3 Claims, 2 Drawing Sheets

GRAFFITI RESISTANT MIRROR

BACKGROUND OF THE INVENTION

This invention relates to mirrors and in particular to a mirror installation which provides some form of protection for the mirror itself. Mirrors located in restaurants, sports venues, and other installations available to the general public are subject to accidental damage and more often, to vandalism including spray painting, scratching and breaking. The operators of such facilities desire to provide a serviceable mirror for the people using the facilities, but the cost of replacing the damaged mirror with a new one is expensive, particularly when such replacements need to be made every few weeks. In some facilities, the problem has been resolved by doing away with mirrors entirely.

Another approach has been to provide a replaceable and inexpensive clear plastic sheet over the mirror surface, with the plastic sheet being easily removed and a new plastic sheet substituted therefore. This type of installation also can be expensive in terms of initial cost and in terms of time and effort involved in replacing the damaged protective sheet.

One proposed solution has been to utilize a frame formed of four extrusions similar to those used for picture frames. The extrusions have a groove on the back side for assembling the four sections into a frame, and two parallel grooves on the front side for holding a mirror and a protective sheet, respectively. Provision is made for slidingly removing and inserting the protective sheet at the front of the assembly.

Another proposed product is somewhat more complex, utilizing a base with a first pair of clamps for holding the mirror on the base, and a second pair of clamps for holding the protective sheet on the mirror, with a frame overlying the clamps and the protective sheet.

Problems with these prior designs include the complexity of the construction and utilization, the cost, the time required for changing protective sheets and the fact that they are not easy to use by unskilled workers.

SUMMARY OF THE INVENTION

Accordingly, it is an object for the present invention to provide a new and improved mirror installation which is simple, easy and inexpensive to manufacture and to install initially and also to change the protective sheet. A further object of the invention is to provide such a mirror installation which is produced using simple sheet metal stampings and which utilizes a minimum number of parts, all of which are easily assembled.

These and other objects, features and results will more fully appear in the course of the following description.

The presently preferred embodiment of the mirror installation of the invention includes a wall mounting plate carrying a reflector surface such as a mirror, a transparent reflector surface protection sheet, positioning means carried on the mounting frame for positioning the transparent sheet over the reflector surface, and a frame or sheet clamp means for attaching to the mounting plate and overlying edges of the transparent sheet for clamping the transparent sheet to the mounting plate over the reflector surface, with the sheet clamp means and the transparent sheet removable and replaceable without disturbing the reflector surface.

DESCRIPTION OF THE PREFERRED EMBODIMENTS

Figure 2:
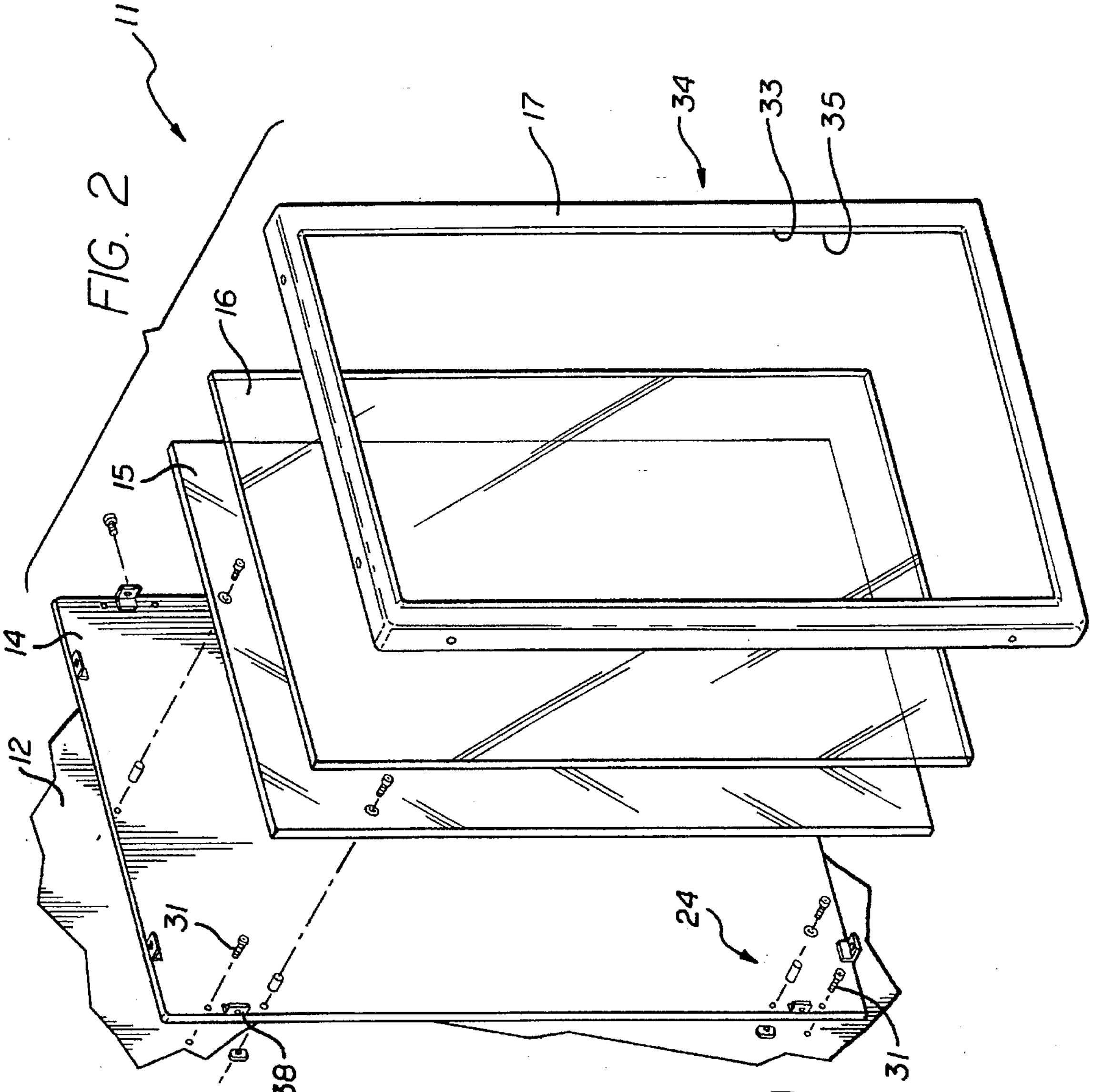
FIG. 2 is an enlarged and exploded view of the mirror installation of FIG. 1.
Figure 1:
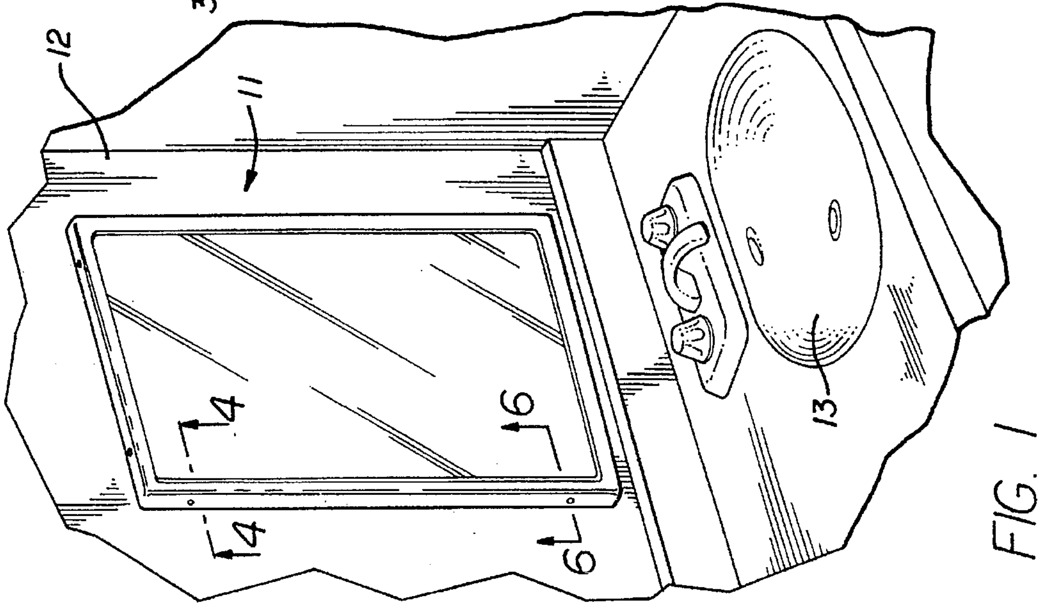
FIG. 1 is a utility view illustrating a mirror installation on the wall of a washroom above a wash basin, and incorporating the presently preferred embodiment of the invention.

The mirror installation 11 of FIG. 2 is shown in FIG. 1 mounted on a wall 12 above a wash basin 13.

The mirror installation 11 includes a wall mounting plate 14, a mirror 15, a surface protection sheet 16, and a frame or sheet clamp 17.

Figure 6:
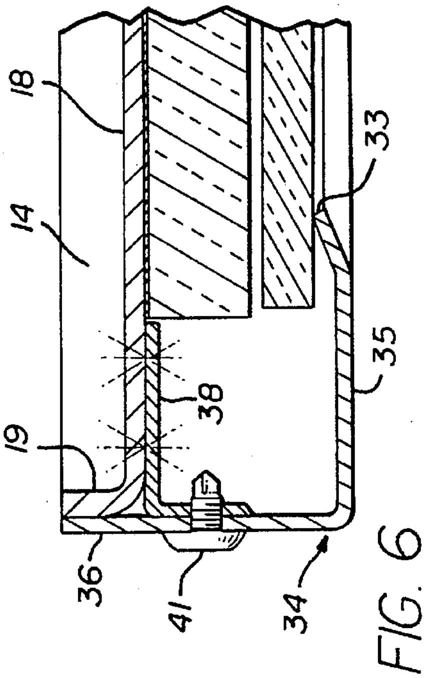
FIG. 6 is an enlarged partial sectional view taken along the line 6—6 of FIG. 1.
Figure 4:
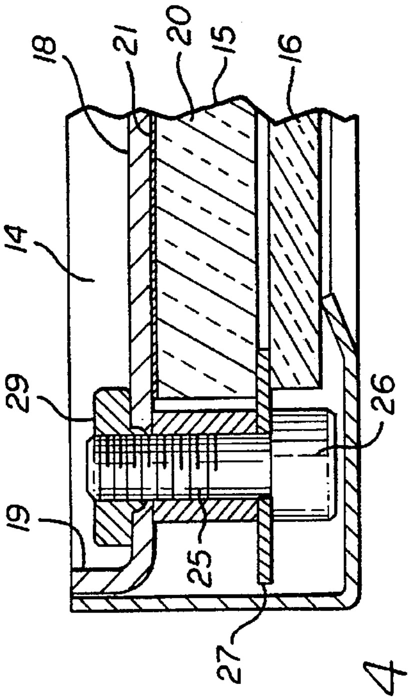
FIG. 4 is an enlarged partial sectional view taken along the line 4—4 of FIG. 1.

The wall plate 14 preferably is pan shaped, with a flat central portion 18 and a perimeter flange 19, as best seen in FIGS. 4 and 6.

The mirror 15 may be conventional in construction, comprising a sheet of glass 20 and a silver reflecting surface 21.

Figure 3:
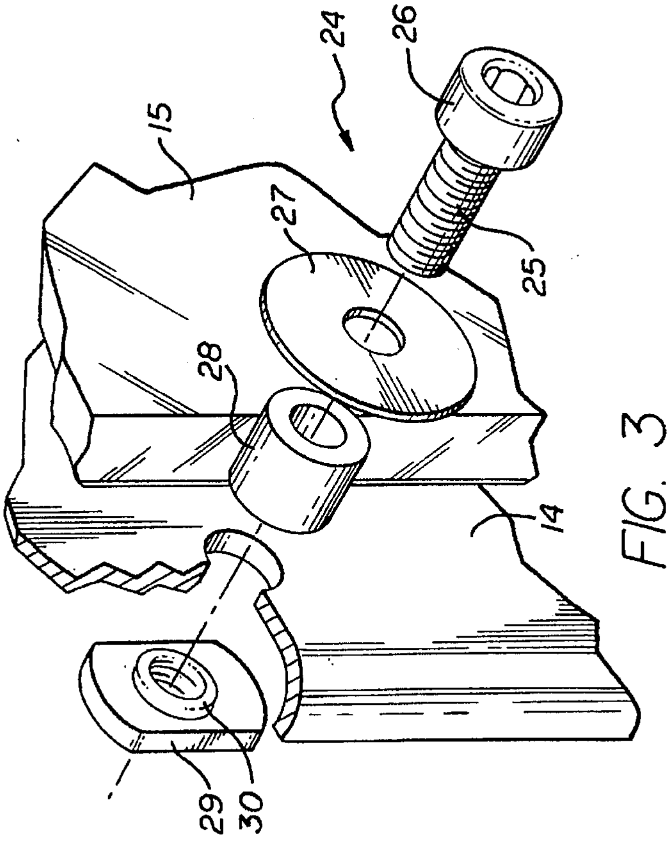
FIG. 3 is an enlarged portion of FIG. 2 illustrating certain details of the mirror positioning means.

In the preferred embodiment illustrated, the mirror 15 is mounted on the wall plate 14 by six screw assemblies 24 positioned around the edges of the mirror, with one screw assembly shown in FIGS. 3 and 4. Each screw assembly includes a screw 25 with head 26, a washer 27, a spacer 28, and a nut 29, with the nut preferably having a rim 30 for positioning in a mating hole in the mounting frame 24. Typically six of the screw assemblies are utilized, with two along each long edge of the mirror and one along each short edge of the mirror.

While the preferred embodiment uses a separate mirror for the reflector surface, an alternative construction, such as a polished mirror like surface may be provided on the wall plate 14 in lieu of a separate mirror.

The wall plate with reflector surface may be attached to the wall by mounting screws 31, typically four such screws are utilized adjacent the four corners of the wall plate.

The frame 17 is attached to the wall plate 14 and functions to maintain the surface protector sheet 16 in position in the mirror installation. Typically the surface protection sheet is a transparent sheet of clear plastic, which is relatively inexpensive in comparison to the cost of a reflector surface of the mirror installation.

Figure 5:
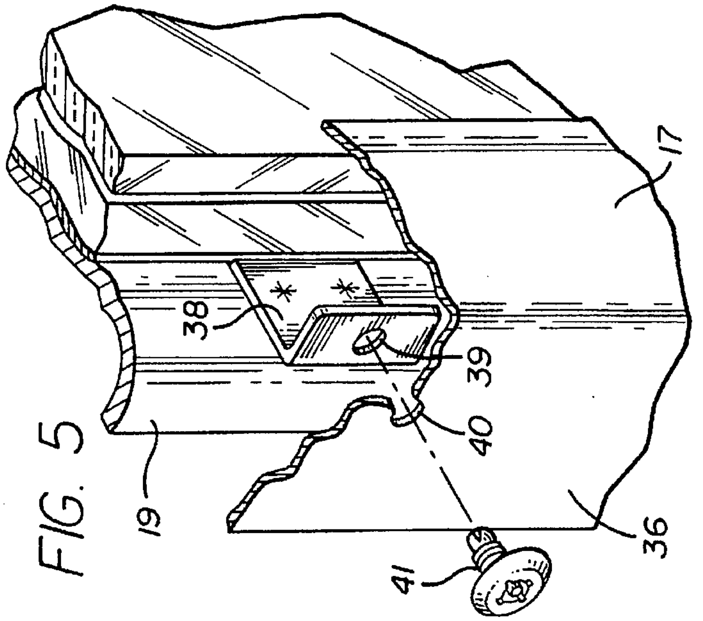
FIG. 5 is another enlarged portion of FIG. 2 illustrating the attachment of the frame or sheet clamp means to the wall mounting plate.

In the preferred embodiment, the frame 17 is a pan with a central opening 33 and a rim 34 with a first edge 35 for clamping engagement with the transparent protection sheet 16, and a second edge 36 for connection to the wall plate 14. In the preferred installation, a plurality of angle brackets 38, typically eight, are attached to the wall plate 14, typically by spot welding, as best seen in FIGS. 5 and 6. Aligned openings 39, 40 are provided in the brackets 38 and the edge 36 of the frame 17, and the frame is attached to the wall plate by screws 41 passing through the openings 39, 40.

The protection sheet 16 rests between the heads 26 of the screws 25, and is pressed against the washers 27 by the edge 35 of the frame, with the inner portion of the edge 35 preferably bent slightly inward to provide a clamping pressure on the protection sheet, as best seen in FIGS. 4 and 6. In the embodiment illustrated, the washers 27 provide for a small space between the surfaces of the mirror 15 and of the protection sheet 16.

The construction as described and illustrated permits use of conventional rectangular shapes for the mirror and the protection sheet, and the use of simple sheet metal stampings for the wall plate and the frame.

The mirror may be attached to the wall plate at the factory, and then this combination may be attached to the wall at the place of use by the screws 31 or other means as desired. Next the protection sheet is placed in position over the mirror and the frame is placed onto the flange 19 of the wall plate. The frame is then fixed in place by the screws 41.

With this construction, the frame is readily removed by removing the screws 41, permitting removal of a damaged protection sheet and replacement with a new protection sheet. The frame is then reinstalled and fastened in place by the screws.

I claim:

1. A mirror installation suitable for mounting on a wall, including in combination:

a wall mounting plate including a reflective surface and having a perimeter flange;

a transparent reflective surface protection sheet;

positioning means carried on said wall plate for positioning said transparent sheet over said reflective surface of said wall plate;

frame means for attaching to said wall plate and overlying edges of said transparent sheet for clamping said transparent sheet to said wall plate over said reflective surface, with said frame means and said transparent sheet removable and replaceable without disturbing said reflective surface;

said frame means comprising a pan with a central opening for viewing said reflective surface and a rim having a first edge for clamping engagement with said transparent sheet and a second edge substantially perpendicular to said first edge for connection to said wall plate;

said positioning means including a plurality of screw assemblies, each of said screw assemblies including a screw with a head and a nut, with said screws passing through said wall plate into said nuts, and with said screw heads providing said positioning means for said transparent sheet, and said screw assemblies further including washers between said transparent sheet and said reflective surface for providing a space therebetween and with said screw, washer and nut clamping said reflective surface in place on said wall mounting plate while permitting said frame means and protection sheet to be removed and replaced; and a plurality of angle mounting brackets, each mounting bracket having an outer surface coplanar with said wall plate perimeter flange, and with said rim of said frame means overlying said wall plate perimeter flange and mounting brackets, and including screws for attaching said overlying rim to said mounting brackets.

2. A mirror installation as defined in claim 1 wherein said reflective surface is a mirror.

3. A mirror installation suitable for mounting on a wall, including in combination:

a wall mounting plate;

a mirror on said mounting plate;

a transparent mirror surface protection sheet;

positioning means carried on said wall plate for positioning said transparent sheet over said mirror; and frame means for attaching to said wall plate and overlying edges of said transparent sheet for clamping said transparent sheet to said wall plate over said mirror, with said frame means and said transparent sheet removable and replaceable without disturbing said mirror;

said positioning means includes a plurality of screw assemblies, each of said screw assemblies including a screw with a head, a washer, a spacer and a nut, with said screw passing through said washer, said spacer and said wall plate into said nut, with said screws and washers clamping said mirror to said wall plate while permitting said frame means and protection sheet to be removed and replaced, and with said screw heads providing said positioning means for said transparent sheet, and with said washers between said transparent sheet and said mirror for providing a space therebetween;

said frame means comprising a pan with a central opening for viewing said mirror and a rim having a first edge for clamping engagement with said transparent sheet and a second edge substantially perpendicular to said first edge for connection to said wall plate;

said wall plate having a perimeter flange and including a plurality of angle mounting brackets, each mounting bracket having an outer surface coplanar with said wall plate perimeter flange, and with said rim of said frame means overlying said wall plate perimeter flange and mounting brackets, and including screws for attaching said overlying rim to said mounting brackets.

* * * * *